United States Patent [19]

Konotsune et al.

[11] Patent Number: 4,981,940
[45] Date of Patent: Jan. 1, 1991

[54] POLYAMIDE HAVING A LOW ELASTIC MODULUS AND A PROCESS FOR PRODUCING THE SAME

[75] Inventors: Shiro Konotsune, Yokosukashi; Takao Kawamoto; Kazutsune Kikuta, both of Ichiharashi, all of Japan

[73] Assignee: Chisso Corporation, Osaka, Japan

[21] Appl. No.: 432,434

[22] Filed: Nov. 6, 1989

[30] Foreign Application Priority Data

Nov. 21, 1988 [JP] Japan .................. 63-294360

[51] Int. Cl.⁵ .................................. C08G 77/04
[52] U.S. Cl. .......................... 528/26; 528/28; 528/38
[58] Field of Search .................. 528/26, 28, 38

[56] References Cited

U.S. PATENT DOCUMENTS

| | | | |
|---|---|---|---|
| 4,338,426 | 7/1982 | Sato et al. | 528/28 |
| 4,672,099 | 6/1987 | Kunimune et al. | 528/26 |
| 4,748,228 | 5/1989 | Shoji et al. | 528/28 |
| 4,818,806 | 4/1989 | Kunimune et al. | 528/38 |

Primary Examiner—Melvyn I. Marquis
Assistant Examiner—Karen A. Hellender
Attorney, Agent, or Firm—Fred Philpitt

[57] ABSTRACT

A polyimide having a low elastic modulus and also superior heat resistance and mechanical characteristics and soluble in solvents and a process for producing the same are provided, which polyimide comprises as main components, 60 to 99% by mol of repetition units of the formula (I) and 1 to 40% by mol of repetition units of the formula (II)

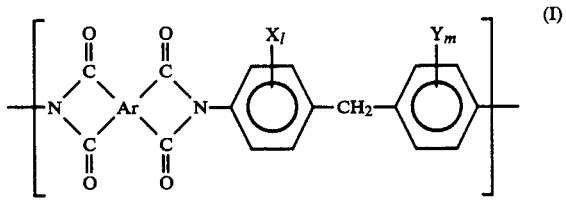

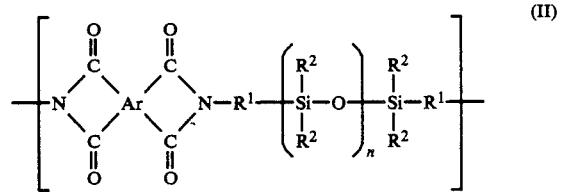

wherein Ar is a tetravalent aromatic group; X and Y are at least one group bonded to phenyl group at o-position relative to N atom and selected from 1–4C alkyl, CO group or OH group; $R^1$ is a 3–5C divalent alkyl or phenylene; $R^2$ is 4 or less C alkyl or phenyl; l and m are each 1 to 4; and n is 20 to 300, and which polyimide is produced by reacting diamino compounds consisting of 60 to 99% by mol of an aromatic diamine of the formula (V) and 1 to 40% by mol of a silicone diamine of the formula (VI), with an aromatic tetracarboxylic acid dianhydride of the formula (IV) in an organic polar solvent at 20°–250° C., (Abstract continued on next page.)

-continued
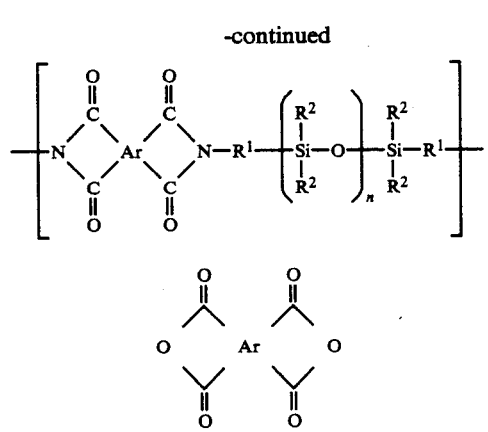
(II)
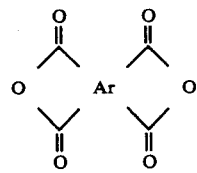
(IV)
-continued
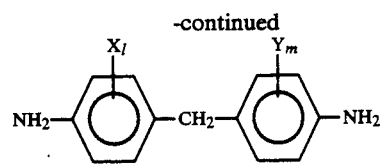
(V)
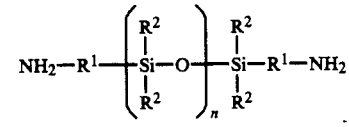
(VI)
wherein Ar, X, Y, $R^1$, l, m and n are each as defined above.
4 Claims, 1 Drawing Sheet

POLYAMIDE HAVING A LOW ELASTIC MODULUS AND A PROCESS FOR PRODUCING THE SAME

BACKGROUND OF THE INVENTION

1. Field of the Invention

This invention relates to a polyimide having a low elastic modulus and superior heat resistance and mechanical characteristics, and a process for producing the same.

2. Description of the Related Art

In general, polyimides are superior in heat resistance, electric characteristics and mechanical characteristics; hence they have been used in broad application fields for heat-resistant, insulating materials in the field of electronic equipments, films, mechanical parts and further, structural materials, etc. However, conventional highly heat-resistant polyimides i.e. totally aromatic polyimides are highly elastic and inferior in the processability. Recently it has been earnestly desired to improve the material characteristics thereof as advanced techniques including semiconductor techniques are developed, and polyimides having a low elastic modulus have been needed; thus a polyimide having high heat-resistance and a low elastic modulus has been desired.

In order to satisfy such needs, a totally aromatic polyimide having a low elasticity has been proposed in e.g. Japanese patent application laid-open Nos. Sho 63-199237/1988 and Sho 63-199238/1988. Further, a low elastic polyimide having a siloxane chain introduced thereinto has been proposed in Japanese patent application laid-open No. Sho 63-35625/1988.

The above-mentioned Japanese patent application laid-open Nos. Sho 63-199237 and Sho 63-199238 disclose reduction in the elasticity of polyamides in the case of a totally aromatic polyimide, but such a polyimide has a tensile, elastic modulus around 200 Kgf/mm² which is, however, a still insufficient value. Further, according to Japanese patent application laid-open No. Sho 63-35625, a polyimide having a tensile elastic modulus lower than 200 Kgf/mm² is obtained using a silicone diamine, but its values of tensile strength and elongation are insufficient. Further, both the former and latter polyimides cannot be obtained in the form of polyimide solution. Thus, in order to obtain polyimides, it is necessary to bake a solution obtained in the form of a polyimide precursor, at a high temperature and for a long time; hence this is commercially uneconomical. Japanese patent application laid-open No. Sho 61-118424 discloses a polysiloxane chain-containing and solvent-soluble polyimide, which, however, cannot be regarded as sufficient in the aspect of heat resistance.

As described above, a polyimide having an elastic modulus lower than 200 Kgf/mm² and superior heat-resistant characteristic and mechanical characteristic both intrinsic of polyimides cannot be found in the prior art.

The present inventors have made extensive research in order to solve the above-mentioned problems and have achieved the present invention.

SUMMARY OF THE INVENTION

The object of the present invention is to provide a polyimide having a superior heat resistance, a good solubility in solvents and a low elastic modulus.

The present invention resides in the following constitutions (1) to (4):

(1) a polyimide soluble in solvents and having a low elastic modulus and comprising as main components, 60 to 99% by mol of repetition units expressed by the following formula (I) and 1 to 40% by mol of repetition units expressed by the following formula (II):

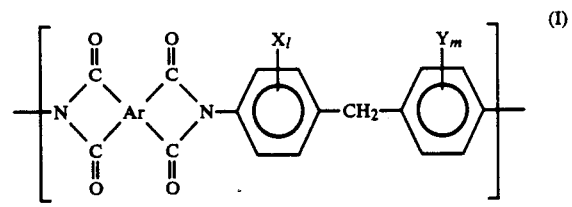

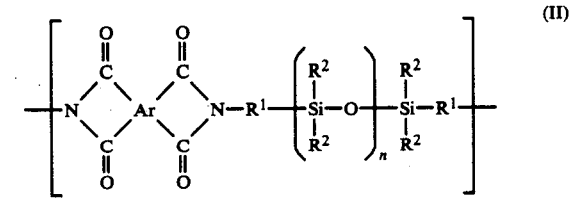

wherein Ar represents a tetravalent aromatic group; X and Y each independently represent at least one group bonded to phenyl group at its ortho-position relative to N atom and selected from alkyl groups of 1 to 4 carbon atoms, halogen groups, carbonyl group or hydroxyl group; $R^1$ represents a divalent alkyl group of 3 to 5 carbon atoms or a phenylene group; $R^2$ represents an alkyl group of 4 or less carbon atoms or a phenyl group; l and m each represent an integer of 1 to 4; and n represents an integer of 20 to 300;

(2) a polyimide soluble in solvents and having a low elastic modulus according to item (1), which satisfies the following relationship (III):

$$0.5 \leq \frac{n[\text{II}]}{[\text{I}] + [\text{II}]} \leq 15.0 \quad (III)$$

wherein [I] and [II] represent the mol fraction of repetition units expressed by said formulas (I) and (II), respectively, and n represents an integer of 20 to 300;

(3) a polyimide soluble in solvents and having a low elastic modulus according to item (1), which polyimide has a logarithmic viscosity number of 0.1 to 5.0 as measured in a solution of N-methyl-2-pyrrolidone of a concentration of 0.5 g/dl at 30° C. and a tensile elastic modulus of 200 Kgf/mm² or less, preferably 200 Kgf/mm² to 20 Kgf/mm²; and (4) a process for producing a polyimide soluble in solvents and having a low elastic modulus and comprising as main components, 60 to 99% by mol of repetition units expressed by the following formula (I) and 1 to 40% by mol of repetition units expressed by the following formula (II), which process comprises reacting diamino compounds consisting of 60 to 99% by mol of an aromatic diamine expressed by the following formula (V) and 1 to 40% by mol of a silicone diamine expressed by the following formula (VI) with an aromatic tetracarboxylic acid dianhydride expressed by the following formula (IV) in an organic polar solvent at 20° to 250° C.:

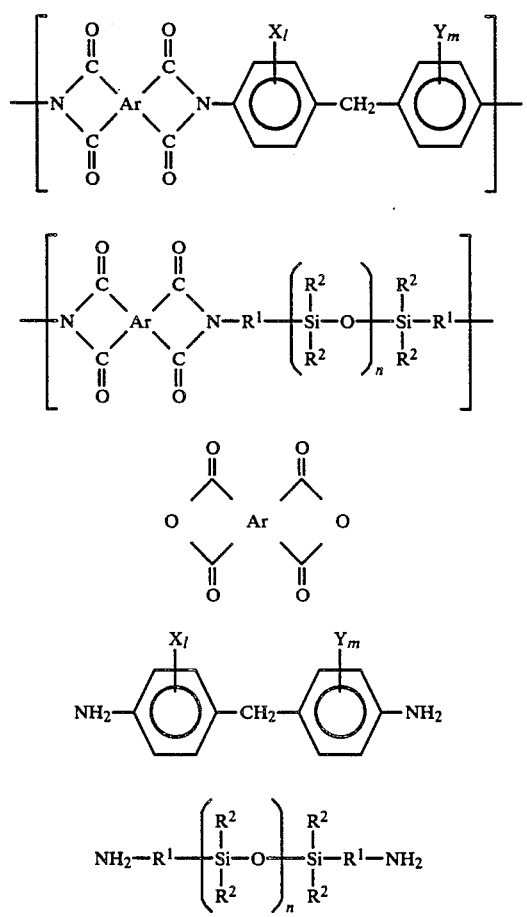

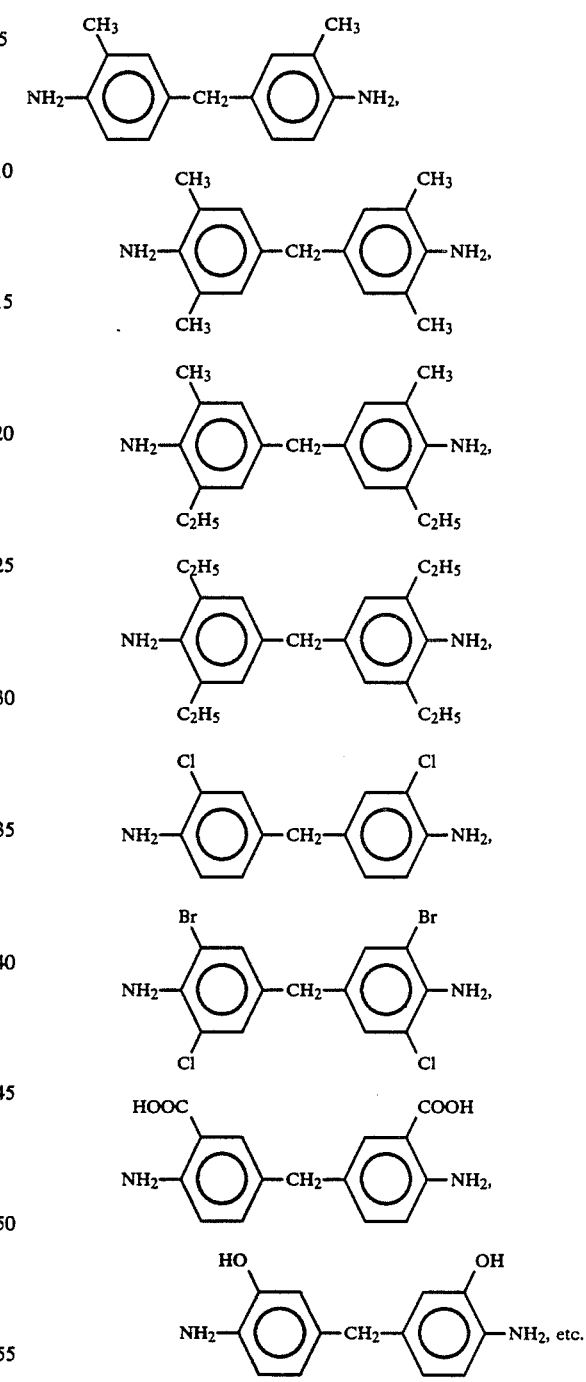

wherein Ar represents a tetravalent aromatic group; X and Y each independently represent at least one group bonded to phenyl group at its ortho-position relative to N atom and selected from alkyl groups of 1 to 4 carbon atoms, halogen group, carbonyl group or hydroxyl group; $R^1$ represents a divalent alkyl group of 3 to 5 carbon atoms or a phenylene group; $R^2$ represents an alkyl group of 4 or less carbon atoms or a phenyl group; l and m each represent an integer of 1 to 4; and n represents an integer of 20 to 300.

DETAILED DESCRIPTION OF PREFERRED EMBODIMENTS

Figure 1:
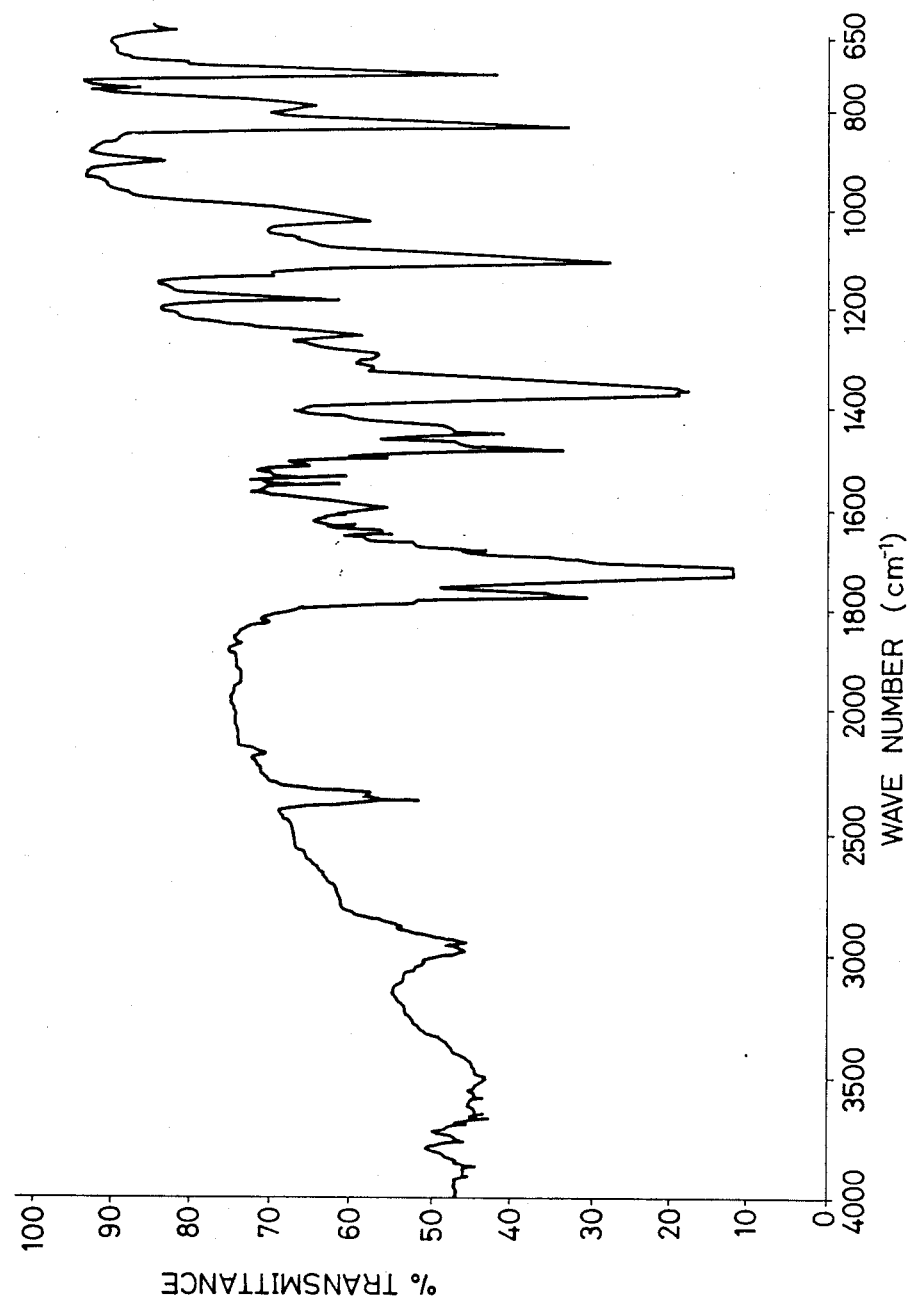
FIG. 1 shows the infrared absorption spectra of the polyimide obtained in the present invention.

The molar ratio of the above aromatic tetracarboxylic acid dianhydride to the above diamino compounds is usually preferred to be equimolecular or nearly equimolecular.

In the process for producing a polyimide of the present invention, examples of the aromatic tetracarboxylic dianhydride used in the present invention are pyromellitic dianhydride, 3,3',4,4'-benzophenone-tetracarboxylic dianhydride, 3,3',4,4'-biphenyltetracarboxylic dianhydride, etc.

The diamino compounds used in the production process of the present invention are aromatic diamines and silicone diamines. Examples of the aromatic diamines are as follows and they may be used alone or together:

A portion of these aromatic diamines may be replaced by e.g. p-phenylenediamine, m-phenylenediamine, 4,4'-diaminodiphenyl ether, 4,4'-diaminophenylmethane, 4,4'-diaminodiphenyl sulfone, 3,3'-diaminodiphenyl fulfone, 3,3'-diaminobenzophenone, o-tolidine, etc., and the quantity thereof used is preferably less than 20% by mol, particularly less than 10% by mol based on the total aromatic diamine component in the aspect of the characteristics of the polyimide of the present invention.

Examples of the silicone diamine are as follows:

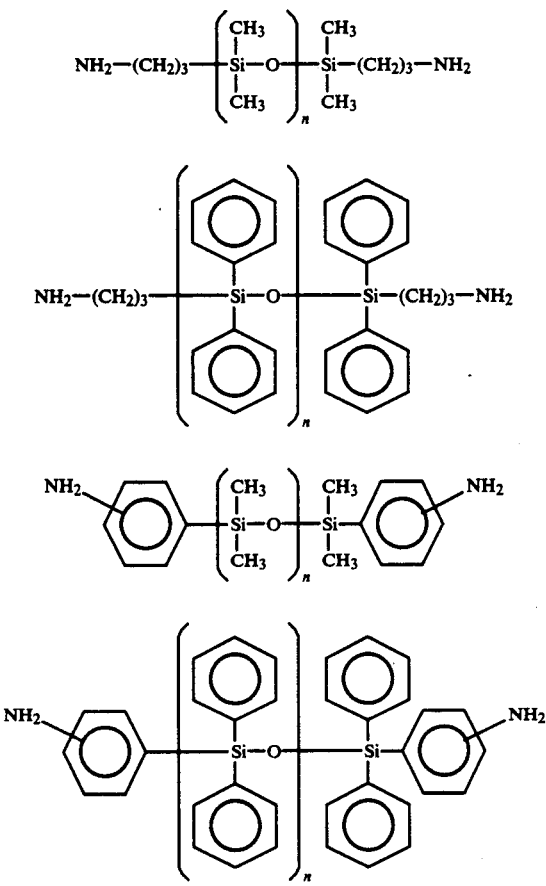

In these formulas, n represents an integer of 20 to 300.

The silicone diamine is an important diamine component for reducing the elastic modulus of the polyimide, and if the n value is small, it is impossible to obtain the polyimide aimed in the present invention, while if the value is too large, the reactivity of the component is inferior and the heat resistance of the resulting polyimide is far reduced. Thus, in order to achieve the object of the present invention, the n value is in the range of 20 to 300, preferably 20 to 200. Further, as to the content of the siloxane bond, it is preferred in the aspect of the characteristics of the polyimide of the present invention that there is a relationship represented by the expression (III), and it is more preferred that there is a relationship represented by the expression $$1.0 \leq \frac{n\,[\mathrm{II}]}{[\mathrm{I}] + [\mathrm{II}]} \leq 10.0$$

Concrete examples of the organic polar solvent used in the process of the present invention are N-methyl-2-pyrrolidone, dimethylformamide, dimethylacetamide, dimethylsulfoxide, etc. Further, in the case where water is byproduced in the reaction, it is preferred to add a solvent azeotropic with water such as benzene, toluene, xylene, etc. to the reaction system and remove the by-produced water to the outside of the system by azeotropy to thereby advance the reaction smoothly. It is usually preferred to feed an aromatic tetracarboxylic acid dianhydride and diamine compounds in an equimolecular ratio or in a nearly equimolecular ratio in an organic polar solvent. The quantity of the solvent used at that time is such that the concentration of the resulting polyimide is preferably 5 to 40% by weight, more preferably 10 to 30% by weight.

The reaction of the aromatic tetracarboxylic acid with the diamino compounds comprises a first step reaction of forming a polyimide precursor which is an amic acid copolymer and a second step reaction of imidization by way of dehydration reaction.

The production of the polyimide of the present invention is characterized by carrying out the above first step reaction and second step reaction at one stage, and the reaction temperature is usually 100° to 250° C., preferably 120° to 200° C. and the reaction is complete usually in 0.5 to 50 hours.

Further, it is also possible to carry out the first step reaction and the second step reaction at two stages. In this case, the first step reaction is carried out at a temperature of 80° C. or lower, particularly 0° to 60° C. for 0.5 to 20 hours to obtain a polyimide precursor, followed by heating the reaction solution to 120° to 200° C. or carrying out imidization using an imidization catalyst such as a tertiary amine and an acid anhydride, at a temperature of 10° to 100° C. to prepare the polyimide of the present invention.

The logarithmic viscosity number of the polyimide of the present invention, obtained by measuring at 30° C. a solution prepared by diluting the resulting polyimide solution with N-methyl-2-pyrrolidone so as to give a concentration of 0.5 g/dl therein, is preferably in the range of 0.1 to 5.0, more preferably in the range of 0.3 to 3.0. If the logarithmic viscosity number is too small, the mechanical strength of film or the like prepared from the resulting polyimide lowers, while if the logarithmic viscosity number is too large, it is difficult to cast the polyimide solution on glass plate or the like so that operation for film-making becomes difficult. The above logarithmic viscosity number refers to that calculated from the following equation, and the dropping time in the equation was measured by a capillary tube:

$$\text{Logarithmic viscosity number } \eta inh = \frac{\ln(t_1/t_0)}{C}$$

wherein $t_1$ refers to a time in which a definite volume of the solution drops through the capillary; $t_0$ refers to a dropping time of the solvent therethrough; and C refers to the concentration of the polymer expressed by gram number of the polymer in 100 ml of the solution.

The effectiveness of the present invention consists in that a polyimide which is heat-resistant and soluble in solvents and has a low elastic modulus is provided. Further, the production process of the present invention is characterized in that in the reaction of an aromatic tetracarboxylic acid with diamino compounds, it is possible to carry out the first step reaction of forming the polyimide precursor which is an amic acid copolymer and the second step reaction of imidization by way of dehydration reaction, at one stage and also it is possible to obtain the polyimide in the form of its solution.

The low elastic polyimide obtained in the present invention is useful particularly for low elastic polyimide film. Only by casting the reaction solution of the polyimide formed according to the production process of the present invention, on a smooth and flat plate such as glass plate, stainless plate, aluminum plate, steel plate, etc. and removing the solvent, it is possible to easily form a polyimide film. Thus, as compared with the conventional case where the polyimide film is formed from the solution of polyimide precursor, it is unnecessary to heat the solution at a high temperature and for a long time so that decomposition of the polymer is slight and the mechanical strengths of the film are superior.

The present invention will be described in more detail by way of Examples, but it should not be construed to be limited thereto. In addition, the physical properties of the resulting film were evaluated as follows:

Tensile test:
measured at 20° C. according to the testing method of ASTM D638.

Five % thermal decomposition temperature:
measured by thermogravimetric analyzer (TGA) manufactured by Seiko Denshi Co., Ltd., at a temperature-raising rate of 10° C./min. in nitrogen gas.

Glass transition temperature:
measured by thermomechanical analyzer (TMA) manufactured by Seiko Denshi Co., Ltd., at a temperature-raising rate of 10° C./min. under a load of 10 g and sought from the inflection point of the resulting curve.

EXAMPLE 1

Into a 500 ml capacity, four-necked, separable flask were fed 4,4'-diamino-3,3',5,5'-tetramethyl

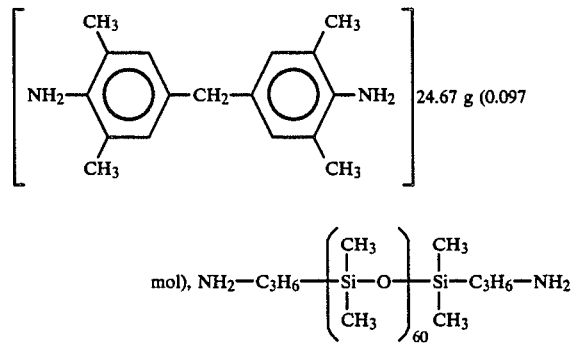

pyromellitic anhydride (21.81 g, 0.100 mol), N-methyl-2-pyrrolidone (250 g) and toluene (50 g) as an azeotropic solvent, followed by refluxing toluene at 180° C. in nitrogen current while agitating the mixture, reacting the mixture for 6 hours while continuously removing water formed by the reaction by azeotropy and then removing toluene to the outside of the reaction system to obtain a uniform and viscous polyimide solution. A portion of the solution was diluted with N-methyl-2-pyrrolidone to prepare a solution of 0.5 g/dl and its logarithmic viscosity number was measured to give 1.12 dl/g. The infrared spectra of the resulting polyimide are shown in FIG. 1. Absorptions based on imide ring formation were observed at $1,780^{-1}$ cm and $720^{-1}$ cm.

The polyimide solution was coated on a glass plate by means of Comma Coater (trademark of Hirano Kinzoku Co., Ltd.) to form a thin film, followed by drying the resulting plate at 100° C. for one hour in a hot air drying oven, fixing the dried film onto a metal frame, and subjecting it to heat treatment at 250° C. for 30 minutes to obtain a polyimide film of 50μ.

The tensile physical properties of the film were as follows:
elastic modulus 144 Kgf/mm$^2$; strength 7.7 Kgf/mm$^2$; and breaking strength 65%.

Further, the polyimide was a superior product having a 5% thermal decomposition temperature of 469° C. and a glass transition temperature of 420° C.

EXAMPLES 2-5 AND COMPARATIVE EXAMPLES 1 AND 2

Example 1 was repeated except that the composition of acid anhydride and diamines was changed to those listed in Table 1. The logarithmic viscosity numbers of the resulting polyimides are listed in Table 1. Further, heat treatment was carried out in the same manner as in Example 1. The tensile physical properties and the 5% thermal decomposition-initiating temperatures of the resulting films are also shown in Table 1.

COMPARATIVE EXAMPLE 3

Into the same apparatus as in Example 1 were fed 4,4'-diaminodiphenyl ether

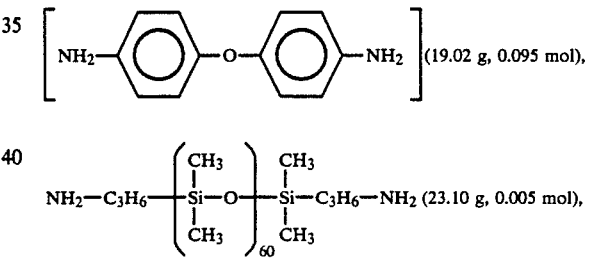

pyromellitic dianhydride (21.81 g, 0.100 mol), N-methyl-2-pyrrolidone (250 g) and toluene (50 g), followed by carrying out the same procedure as in Example 1. As a result, a portion of the resulting polymer began to precipitate in the vicinity of 140° C. and further the heating reaction was continued, but no uniform polyimide solution was obtained.

TABLE 1

| | | Example | | | | Comp. ex. | |
|---|---|---|---|---|---|---|---|
| | | 2 | 3 | 4 | 5 | 1 | 2 |
| Acid anhydride (mol) | 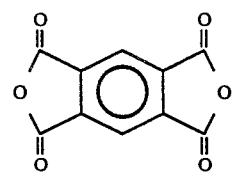 | 0.100 | — | 0.040 | — | 0.100 | |

TABLE 1-continued

| | | Example 2 | Example 3 | Example 4 | Example 5 | Comp. ex. 1 | Comp. ex. 2 |
|---|---|---|---|---|---|---|---|
| | benzophenone tetracarboxylic dianhydride (structure) | — | 0.100 | — | — | — | 0.100 |
| | biphenyl tetracarboxylic dianhydride (structure) | — | — | 0.060 | 0.100 | — | — |
| Diamine (mol) | 4,4'-methylenebis(2,6-dimethylaniline) (structure) | 0.090 | — | 0.098 | — | 0.060 | — |
| | 4,4'-methylenebis(2-chloroaniline) (structure) | — | 0.096 | — | — | — | — |
| | 4,4'-methylenebis(2-methyl-6-ethylaniline) (structure) | — | — | — | 0.075 | — | 0.070 |
| | 4,4'-oxydianiline (structure) | — | — | — | 0.010 | — | — |
| Siliconediamine (mol) | $NH_2-C_3H_6-[Si(CH_3)_2-O]_{120}-Si(CH_3)_2-C_3H_6-NH_2$ | — | 0.004 | — | — | — | — |
| | $NH_2-C_3H_6-[Si(CH_3)_2-O]_{60}-Si(CH_3)_2-C_3H_6-NH_2$ | 0.010 | — | 0.002 | 0.015 | — | — |
| | $NH_2-C_3H_6-[Si(CH_3)_2-O]_{6}-Si(CH_3)_2-C_3H_6-NH_2$ | — | — | — | — | — | 0.030 |
| | $NH_2-C_3H_6-Si(CH_3)_2-O-Si(CH_3)_2-C_3H_6-NH_2$ | — | — | — | — | 0.040 | — |
| | Logarithmic viscosity no. [η] | 0.88 | 0.92 | 1.04 | 0.67 | 0.71 | 0.64 |

TABLE 1-continued

|  | Example | | | | Comp. ex. | |
|---|---|---|---|---|---|---|
|  | 2 | 3 | 4 | 5 | 1 | 2 |
| Strength (kgf/mm$^2$) | 4.4 | 4.8 | 8.9 | 3.9 | 6.4 | 5.5 |
| Elongation (%) | 58 | 49 | 60 | 41 | 7 | 15 |
| Elastic modulus (kgf/mm$^2$) | 83 | 101 | 175 | 72 | 225 | 189 |
| 5% thermal decomp. temp. (°C.) | 450 | 462 | 455 | 404 | 369 | 387 |
| Glass transit. temp. (°C.) | 342 | 357 | 371 | 321 | 253 | 215 |

As seen from Table 1, the heat-resistant resins of Examples 1 to 5 obtained according to the present invention have an elastic modulus of 200 Kgf/mm$^2$ or lower and sufficient values of mechanical properties for films. Further, it is seen that a polyimide having a 5% thermal decomposition temperature of 400° C. or higher, a glass transition temperature of 300° C. or higher and a superior solubility in solvents, never observed in conventional polyimides.

What is claimed is:

1. A polyimide soluble in solvents and having a low elastic modulus and comprising as main components, 60 to 99% by mol of repetition units expressed by the following formula (I) and 1 to 40% by mol of repetition units expressed by the following formula (II):

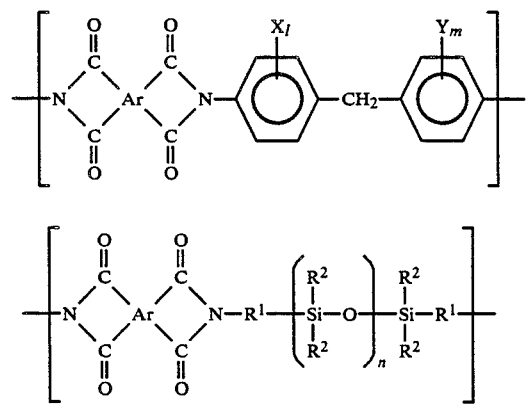

wherein Ar represents a tetravalent aromatic group; X and Y each independently represent at least one group bonded to phenyl group at its ortho-position relative to N atom and selected from alkyl groups of 1 to 4 carbon atoms, halogen groups, carbonyl group or hydroxyl group; R$^1$ represents a divalent alkyl group of 3 to 5 carbon atoms or a phenylene group; R$^2$ represents an alkyl group of 4 or less carbon atoms or a phenyl group; l and m each represent an integer of 1 to 4; and n represents an integer of 20 to 300.

2. A polyimide according to claim 1 which has an elastic modulus that satisfies the following relationship (III):

$$0.5 \leq \frac{n[II]}{[I] + [II]} \leq 15.0 \quad (III)$$

wherein [I] and [II] represent the mol fraction of repetition units expressed by said formulas (I) and (II), respectively, and n represents an integer of 20 to 300.

3. A polyimide according to claim 1 which has a logarithmic viscosity number of 0.1 to 5.0 as measured in N-methyl-2-pyrrolidone having a concentration of 0.5 g/dl at 30° C. and a tensile elastic modulus of 200 Kgf/mm$^2$ or less.

4. A process for producing a polyimide soluble in solvents and having a low elastic modulus and comprising as main components, 60 to 99% by mol of repetition units expressed by the following formula (I) and 1 to 40% by mol of repetition units expressed by the following formula (II), which process comprises reacting diamino compounds consisting of 60 to 99% by mol of an aromatic diamine expressed by the following formula (V) and 1 to 40% by mol of a silicone diamine expressed by the following formula (VI) with an aromatic tetracarboxylic acid dianhydride expressed by the following formula (IV) in an organic polar solvent at 20° to 250° C.:

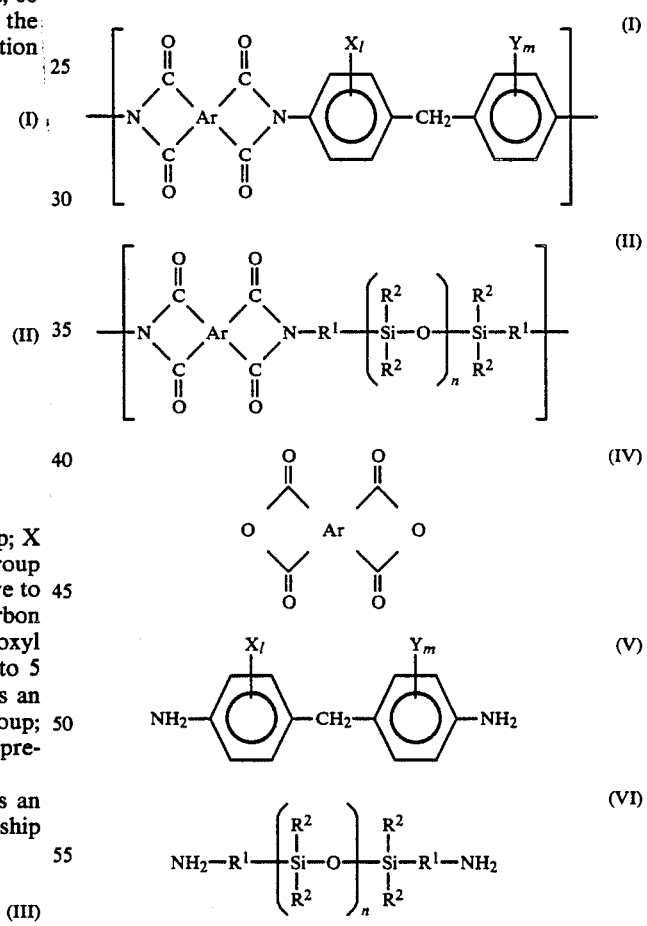

wherein Ar represents a tetravalent aromatic group; X and Y each independently represent at least one group bonded to phenyl group at its ortho-position relative to N atom and selected from alkyl groups of 1 to 4 carbon atoms, halogen group, carbonyl group or hydroxyl group; R$^1$ represents a divalent alkyl group of 3 to 5 carbon atoms or a phenylene group; R$^2$ represents an alkyl group of 4 or less carbon atoms or a phenyl group; l and m each represent an integer of 1 to 4; and n represents an integer of 20 to 300.

* * * * *